J. H. WHITING.
ROTARY ENGINE OR PUMP.
APPLICATION FILED SEPT. 29, 1919.

1,368,869.

Patented Feb. 15, 1921.
2 SHEETS—SHEET 1.

Witnesses:

Inventor:
JOHN H. WHITING
BY
ATTORNEY.

J. H. WHITING.
ROTARY ENGINE OR PUMP.
APPLICATION FILED SEPT. 29, 1919.
1,368,869.
Patented Feb. 15, 1921.
2 SHEETS—SHEET 2.
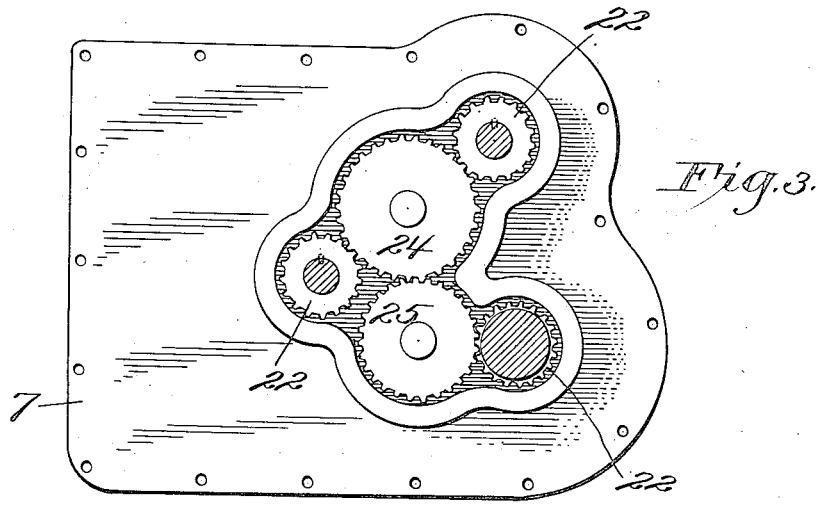
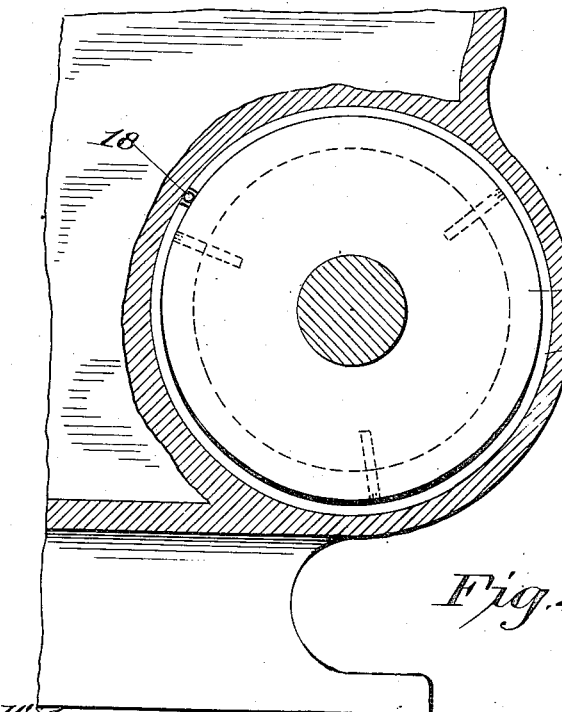
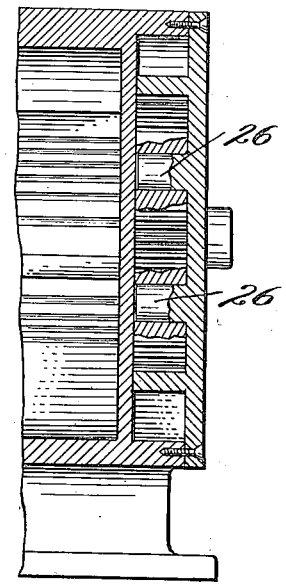
Inventor:
JOHN H. WHITING
BY
ATTORNEY.

UNITED STATES PATENT OFFICE.

JOHN HARVEY WHITING, OF PUNXSUTAWNEY, PENNSYLVANIA.

ROTARY ENGINE OR PUMP.

1,368,869.　　　　　Specification of Letters Patent.　　Patented Feb. 15, 1921.

Application filed September 29, 1919. Serial No. 327,223.

*To all whom it may concern:*

Be it known that I, JOHN HARVEY WHITING, a citizen of the United States, residing at Punxsutawney, in the county of Jefferson and State of Pennsylvania, have invented new and useful Improvements in Rotary Engines or Pumps, of which the following is a specification.

This invention relates to an improved rotary engine or pump of the type wherein the active element is provided with radially projecting pistons and coöperates with an arrangement of rotary abutments having recesses to accommodate said pistons at a period of the rotation of the active element.

The principal objects of the invention are to make effective provision for the protection of the active element and of the abutments against grit or sediment carried over with the fluid which flows through the structure; to provide a structure which shall always retain a sufficient quantity of water for priming when used as a pump; to secure more effective sealing coöperation among the active element, the abutments and the walls of the chambers in which the abutments operate; to provide abutments which are positively driven from the active element but wherein the transmission stresses are reduced to a minimum; and to secure simplicity and sturdiness of structural organization and detail.

With the above objects in view, the invention consists in certain features of structure, combination and relation which will be set forth in detail as the description proceeds.

An embodiment of the invention is illustrated in the accompanying drawing, wherein:—

Figure 2:
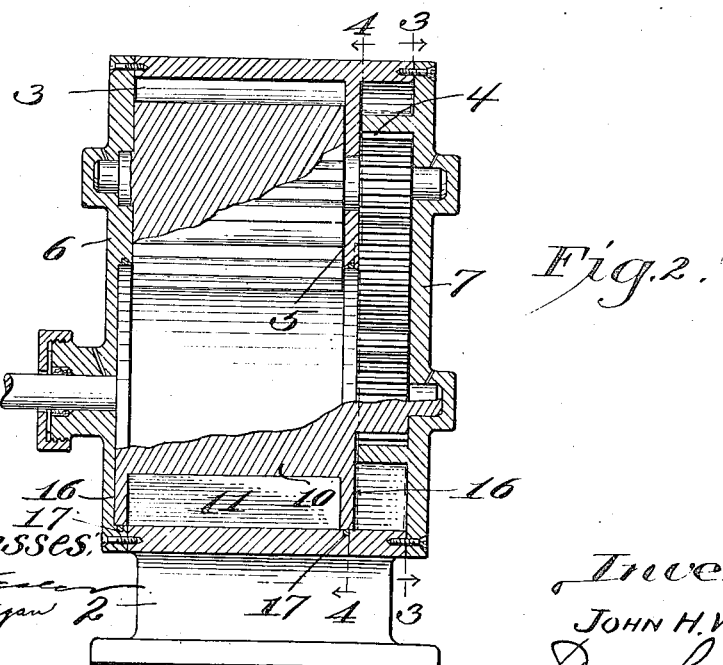
Fig. 2 is a cross-section on the line 2—2 of Fig. 1.

Figs. 3 and 4 are vertical sectional views on the lines 3—3 and 4—4, Fig. 2; and Fig. 5 is a detail cross-sectional view showing the mounting of certain gear elements employed for driving the abutments from the active element of the structure.

Similar characters of reference designate corresponding parts throughout the several views.

The operating parts are inclosed in the casing 1 which may be provided with a suitable supporting pedestal 2 and which is formed internally into a working chamber 3 and a gear chamber 4, said chambers having a common wall in the longitudinal partition 5 and being closed by the removable side plates 6 and 7, respectively. The front wall of the casing is provided with a downwardly extending inlet passage 8; and at the rear of the casing, preferably in its upper wall, an opening 9 provides for the discharge of the liquid which flows through the structure. The passage 8 terminates in adjacency to a transversely arranged active element or rotor 10 provided in the direction of its length with radially projecting blades 11, functioning as pistons. The casing is formed below the inlet passage 8 with a cylindrical surface 12 which has an extent of approximately a third of a circle and which coöperates with the pistons 11, the surface 12 projecting forward to a slight extent from the lower end of the passage 8. The element 10 is of cylindrical form and coöperates with a pair of rotary cylindrical abutments 13 and 14 which are arranged transversely of the working chamber and are provided with longitudinal clearances 15 to accommodate the pistons 11, of which there are three in the embodiment shown.

The active element 10 is provided at its ends with circumscribing flanges 16, these projecting to the same extent as the pistons 11. One of the flanges 16 fits in a recess in the side plate 6 and is flush with the inner face of said plate, and the other flange 16 fits in an opening in the partition 5 and is flush with the faces of said partition. The recess and opening in which the flanges 16 are arranged are preferably provided with annular grooves to accommodate suitable contractile packing rings 17 which may be held against rotation by cross-pins 18 (Fig. 4) arranged between their adjacent terminals and secured in the walls of the grooves, the rings 17 preventing the passage of the liquid beyond the flanges 16. The abutments 13 and 14 are co-extensive with the active element 10 and operate between the flanges 16 of said element. Said abutments are preferably of the same diameter as the element 10 and are arranged to bear with relatively strong frictional pressure against the surface of said element in such relation that the seal around the periphery of the element will be continuously maintained, each abutment functioning during the passage of the pistons through the clearances of the other abutment. Said abutments are arranged on axes located above the axis of the active element and operate in relation to cylindrical surfaces, each preferably of more than half a circle in extent. Both of the abutments are arranged under a partition 19 which functions also as a protecting shield.

In some instances, for example, in operating as an air motor or in pumping gas or water under low head, it is advisable to construct the abutments of material having a certain sensible elasticity, such as rubber. The use of such material in the construction of such abutments provides an absolutely tight joint wherein there is no binding of the parts. Since the material of the abutments will be under slight compression, by virtue of the pressure with which the abutments bear upon the active element, there will be a slight extension in the length of the abutment which augments the tightness of the contact between the end faces of the abutments and the flanges of the active element, thus promoting the efficiency of the seal.

Figure 1:
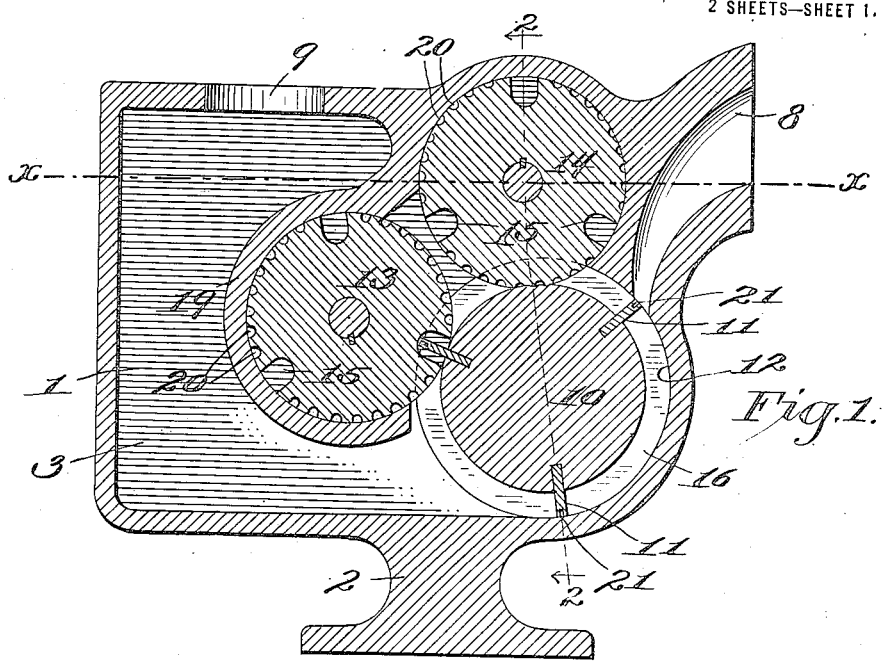
Figure 1 is a vertical central section.

The casing having the characteristics described is of such form that, when the structure is used as a pump, the active element 10 is always submerged in water which reaches the level represented by the line X—X of Fig. 1. Water is thus maintained as a priming element when the action of the pump is arrested or when air is drawn into the suction line.

The inlet passage 8 is preferably co-extensive in width with the working chamber 3 and its outline and relation to the bore of the active element are such that any foreign matter heavier than and carried in the water, such as sand, will be projected toward the body of the active element and away from the cylindrical surface with which the pistons 10 coöperate. Any abrasive substances carried over in the water pass harmlessly to the outlet before centrifugal force has time to act sensibly in projecting them against the cylindrical surface with which the pistons coöperate, it being noted that the piston contact with such surface is very slightly greater than a third of a circle. Further protection against the abrasive effects of solid matters carried over in the water is afforded by the partition 19 which permits the water to pass upward behind it but prevents sand or the like from falling back upon the abutments or the active element.

The abutments are not only protected against abrasive substances by the partition 19 but are also protected by virtue of their location above the active element and remote from the channel of the passing liquid. Further protection in this regard may be provided by forming the abutments with relatively wide and shallow longitudinal grooves 20 which may be somewhat closely associated and which by trapping any grit or sediment that may find its way against the surface of the abutments will prevent the scratching or wear of the cylindrical surfaces with which the abutments coöperate. The provision of the grooves 20 is of further advantage in that it increases the security or strength of the contact between the abutments and the cylindrical surfaces with which they coöperate. The faces of the pistons 11 which coöperate with the surface 12 may be formed with grooves 21 to protect said surface against grit or sediment which may be carried over with the liquid, said grooves functioning in this regard similarly to the grooves 20. The side plates 6 and 7 are provided with suitable bearings for the trunnions of the abutments and for the shaft of the active element. The trunnions of the abutments have a close fit in openings in the partition 5. Where, as preferred, the abutments are of the same diameter as the active element, they must rotate at the same speed as said element. A direct engagement of the various gears in a ratio of one to one has the disadvantage of setting up, under conditions of high speed rotation, severe transmission stresses. To obviate this disadvantage, I propose to use the gear arrangement shown in Fig. 3 according to which the abutments are provided with pinions 22 of the same diameter as the driving pinion 23 mounted on the shaft of the active element. The pinions 22 are driven from a larger intermediate pinion 24, the latter being driven from the pinion 23 by an intermediate pinion 25. The intermediate pinions 24 and 25 which are mounted on studs 26 formed with the side plate 7 may be of any desired size but the pinions directly associated with the active element and with the abutments must be of equal size.

I claim as my invention:—

1. In a machine of the type set forth in combination, a casing having a single fluid passage, a rotary cylindrical active element, coöperating with said passage, two rotary cylindrical abutments engaging said element, three pistons projecting from the cylindrical surface of said element and spaced equidistant apart, said abutments having clearances for said pistons, and being arranged whereby one of said abutments will be in sealing engagement with said element substantially centrally of the surface between two adjacent clearances when a piston is passing through a clearance space of the other abutment.

2. In a machine of the type set forth, in combination, a rotary cylindrical active element and a rotary cylindrical abutment engaging and coöperating with said element and having its body formed of somewhat elastic material, said abutments thereby being capable of compression in a radial direction and extension in a longitudinal direction.

3. In a machine of the type set forth, in combination, a rotary cylindrical active element having radially projecting longitudinal blades functioning as pistons and having circumscribing end flanges projecting to the same depth as said blades and a rotary cylindrical abutment engaging said element and operating between its end flanges, said abutment having longitudinal clearances for said pistons and having its body formed of somewhat elastic material thereby presenting a surface which may be compressed in a radial direction with consequent extension in a longitudinal direction, thereby insuring a close contact between the ends of the cylindrical abutment and the flanges of the active element.

4. In a machine of the type set forth, in combination, a working chamber having an inlet and an outlet, a rotary active element adjacent said inlet, said chamber being formed to provide a liquid channel concentric to said element and which extends from said inlet and discharges into said chamber at a point below said element and rotary abutment means coöperating with said element and located opposite said channel.

5. In a machine of the type set forth, in combination, a working chamber having an inlet and an outlet, a rotary active element adjacent said inlet, said chamber being formed to provide a liquid channel concentric to said element and which extends from said inlet and discharges into said chamber at a point below said element, rotary abutment means coöperating with said element and located opposite said channel, and a partition overhanging said abutment means and located between the same and the outlet.

6. In a machine of the type set forth, the combination of a rotary active element, a rotary abutment having the same diameter as said active element and coöperating therewith, pinions of the same size directly associated with said element and abutment and intermediate connecting pinions of larger size.

7. In a machine of the type set forth, the combination of a rotary active element, a pair of rotary abutments, each having the same diameter as said active element and coöperating therewith, pinions of the same diameter directly associated with said abutments and element, and mutually engaging intermediate pinions, one of which engages with the pinion of said element and the other of which engages with the pinions of said abutments.

In testimony whereof I have hereunto set my hand in presence of two subscribing witnesses.

JOHN HARVEY WHITING.

Witnesses:
   CHAS. S. HYER,
   JAMES L. NORRIS.